United States Patent
Suzuki

(10) Patent No.: US 8,201,940 B2
(45) Date of Patent: Jun. 19, 2012

(54) METHOD FOR DESIGNING EYEGLASS LENS AND METHOD FOR MANUFACTURING THE SAME

(75) Inventor: Yohei Suzuki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 12/913,656

(22) Filed: Oct. 27, 2010

(65) Prior Publication Data

US 2011/0116038 A1    May 19, 2011

(30) Foreign Application Priority Data

Nov. 13, 2009   (JP) ................................. 2009-259696

(51) Int. Cl.
G02C 7/02    (2006.01)
(52) U.S. Cl. ................................................. 351/159.74
(58) Field of Classification Search .................. 351/159, 351/168, 169, 177, 159.01, 159.73–159.75, 351/159.41, 159.42
See application file for complete search history.

(56) References Cited

U.S. PATENT DOCUMENTS

| | | | | |
|---|---|---|---|---|
| 6,827,443 B2 | 12/2004 | Fisher et al. | | 351/209 |
| 7,434,935 B2 | 10/2008 | Bonnin | | 351/246 |
| 2007/0229761 A1 | 10/2007 | Carol et al. | | 351/209 |
| 2007/0242221 A1 | 10/2007 | Guilloux et al. | | 351/177 |
| 2008/0106697 A1 | 5/2008 | Pedrono | | 351/246 |
| 2009/0290125 A1 | 11/2009 | Varnas et al. | | 351/246 |

FOREIGN PATENT DOCUMENTS

| | | |
|---|---|---|
| JP | 2003-523244 | 8/2003 |
| JP | 2007-241276 | 9/2007 |
| JP | 2007-536043 | 12/2007 |
| JP | 2008-511033 | 4/2008 |
| JP | 2008-521027 | 6/2008 |
| JP | 2008-249828 | 10/2008 |
| JP | 2008-541142 | 11/2008 |
| WO | WO 2006/054985 A1 | 5/2006 |

*Primary Examiner* — Darryl J Collins
(74) *Attorney, Agent, or Firm* — DLA Piper LLP (US)

(57) ABSTRACT

A method for designing an eyeglass lens includes: a basic value calculation step of determining a basic visualizing action index representing a visualizing action taken when a person who wears no eyeglasses or single-vision lenses looks at an object; a progressive value calculation step of determining a progressive visualizing action index representing a visualizing action taken when the person who wears reference progressive addition lenses looks at the object; and a lens designing step of enlarging the field of view as compared with that of the reference progressive addition lenses when the progressive visualizing action index shows greater head movement than the basic visualizing action index does, whereas enlarging an aberration region as compared with that of the reference progressive addition lenses when the progressive visualizing action index shows smaller head movement than the basic visualizing action index does.

3 Claims, 4 Drawing Sheets

METHOD FOR DESIGNING EYEGLASS LENS AND METHOD FOR MANUFACTURING THE SAME

BACKGROUND

1. Technical Field

The present invention relates to a method for designing an eyeglass lens in accordance with a visualizing action of each person and a method for manufacturing the eyeglass lens.

2. Related Art

Each person follows his/her own way when looking at an object. For example, when looking sideways, upward, or downward, a person rotates the head or the eyes (such an action will hereinafter be referred to as a visualizing action). The angle of rotation of the head or the eyes is specific to each person, and a variety of methods for designing an eyeglass lens in accordance with such a visualizing action of each person have been proposed. For example, the actual angle of rotation of the head or the eyes is measured when a person under test looks at an object, and a lens is then designed in accordance with the result of the measurement (see JP-T-2003-523244, the term "JP-T" as used herein means a published Japanese translation of a PCT patent application, JP-T-2007-536043, JP-A-2007-241276, JP-T-2008-521027, JP-A-2008-249828, JP-T-2008-511033, and JP-T-2008-541142).

On the other hand, a progressive addition lens is an aspheric lens including two refracting regions having different refracting power and a progressive region (intermediate region) which is located between the refracting regions and where the refracting power (dioptric power) progressively changes. In the thus configured progressive addition lens, aberrations present on both sides of the intermediate region limit the field of view. Further, a difference in magnification between the two refracting regions distorts an image, which leads to a phenomenon called "wobbling" in which an image appears to wobble when a person who wears progressive addition lenses moves the head.

In JP-T-2003-523244, JP-T-2007-536043, JP-A-2007-241276, JP-T-2008-521027, JP-A-2008-249828, JP-T-2008-511033, and JP-T-2008-541142, an eyeglass lens is designed in accordance with the actual angle of rotation of the head or the eyes (visualizing action), but no consideration is given to the balance between the size of the field of view of a progressive addition lens and the wobbling/distortion present therein. Further, no consideration is given to the change in visualizing action due to added aberrations and wobbling. Since the tolerance to aberrations and the tolerance to wobbling differ from person to person, an optimal lens for each wearer can be achieved by designing a progressive addition lens in accordance with the tolerance characteristics of the wearer.

SUMMARY

An advantage of some aspects of the invention is to provide a method for designing an eyeglass lens in consideration of a visualizing action specific to a wearer who wears a progressive addition lens so that the wearer can wear the progressive addition eyeglass lens more comfortably. Another advantage of some aspects of the invention is to provide a method for manufacturing the eyeglass lens.

A method for designing an eyeglass lens according to a first aspect of the invention includes a basic value calculation step of determining a basic visualizing action index representing a visualizing action taken when a person who wears no eyeglasses or single-vision lenses looks at an object, a progressive value calculation step of determining a progressive visualizing action index representing a visualizing action taken when the person who wears reference progressive addition lenses looks at the object, and a lens designing step of enlarging a field of view as compared with that of the reference progressive addition lenses when the progressive visualizing action index shows greater head movement than the basic visualizing action index does, whereas enlarging an aberration region as compared with that of the reference progressive addition lenses when the progressive visualizing action index shows smaller head movement than the basic visualizing action index does.

The visualizing action is a head rotating action or an eye rotating action taken by a person who looks at an object. Specifically, the visualizing action corresponds to the angle of rotation of the head or the eyes moved when the person looks at an object. The visualizing action index represents how much the person moves the head or the eyes when looking at an object. For example, the visualizing action index can be expressed by the ratio of the angle of rotation of the head to the angle between the direction facing the person and the direction in which the object is actually present, or the ratio of the angle of rotation of the eyes to the angle between the direction facing the person and the direction in which the object is actually present. Those who primarily move their heads to look at an object are called head movers (HMs), whereas those who primarily move their eyes to look at an object are called eye movers (EMs).

A visualizing action taken when a person who wears no eyeglasses or single-vision lenses looks at an object differs from a visualizing action taken when the person who wears progressive addition lenses looks at the object. The reason for this is that aberrations and distortion are present in a progressive addition lens. For example, those who have low tolerance to aberrations take a visualizing action that allows them to avoid an aberration region of the progressive addition lens that they wear. On the other hand, those who have low tolerance to wobbling tend to look at an object without moving their heads. The visualizing action thus differs depending on each person's tolerance to aberrations and wobbling.

In the aspect of the invention, the basic visualizing action index as an index representing a visualizing action taken by a person who wears no eyeglasses or single-vision lenses and the progressive visualizing action index as an index representing a visualizing action taken by the person who wears progressive addition lenses are first calculated. One can estimate the person's tolerance to aberrations and wobbling by using the difference between the basic visualizing action index and the progressive visualizing action index.

Specifically, when the progressive visualizing action index shows greater head movement than the basic visualizing action index does (when the visualizing action index is shifted toward HM), it is speculated that the person has low tolerance to aberrations but high tolerance to wobbling. In this case, the lens design is preferably performed in such a way that the field of view is enlarged as compared with that of a reference progressive addition lens. Therefore, in this case, the lens design is performed in such a way that the field of view is wide, that is, the aberration region is narrow. Designing a lens this way is called "hard" design. How wide the field of view should be may be determined in accordance with the difference between the basic visualizing action index and the progressive visualizing action index.

On the other hand, when the progressive visualizing action index shows smaller head movement than the basic visualizing action index does (when the visualizing action index is shifted toward EM), it is speculated that the person has high tolerance to aberrations but low tolerance to wobbling. Therefore, in this case, the lens design is performed in such a way that the field of view is narrow and the aberration region is wide so that the amount of maximum aberration decreases and hence the person unlikely feels wobbling. Designing a lens this way is called "soft" design. How narrow the field of view should be may be determined in accordance with the difference between the basic visualizing action index and the progressive visualizing action index.

According to the aspect of the invention, the lens design is performed in consideration of each person's tolerance to aberrations and wobbling present in a progressive addition lens, whereby an eyeglass lens that the person can wear more comfortably is provided.

In the method for designing an eyeglass lens according to the first aspect of the invention, the basic value calculation step preferably includes measuring an angle $\beta s_n$ between the direction facing the person and the direction in which the head is oriented when the person looks at an object located in the direction inclined to the direction facing the person by an angle $\alpha_n$ and calculating a basic visualizing action index $Ms_n$ by using the following Equation (1). The progressive value calculation step preferably includes measuring an angle $\beta p_n$ between the direction facing the person and the direction in which the head is oriented when the person looks at the object located in the direction inclined to the direction facing the person by the angle $\alpha_n$ and calculating a progressive visualizing action index $Mp_n$ by using the following Equation (2). The lens design step preferably includes selecting a design type determined in advance for the basic visualizing action index and the progressive visualizing action index.

$$Ms_n = \frac{\beta s_n}{\alpha_n} \quad (n = 1, 2) \qquad (1)$$

(In Equation (1), n represents each object)

$$Mp_n = \frac{\beta p_n}{\alpha_n} \quad (n = 1, 2) \qquad (2)$$

In Equation (2), n represents each object)

In the aspect of the invention, the basic visualizing action index $Ms_n$ is calculated by using Equation (1) described above, and the progressive visualizing action index $Mp_n$ is calculated by using Equation (2) described above. In Equations (1) and (2), the visualizing action indices represent how much the head is moved. For example, a visualizing action index of 0.8 means that 80% of the whole action taken when the person looks at an object is head movement and the remaining 20% is eye movement.

Further, lens design types relevant to the basic visualizing action index and the progressive visualizing action index are created in advance in a relationship table obtained from sampled statistical data. The relationship table contains a plurality of lens design types ranging from the lens design type for those who move only (100%) their heads when looking at an object to the lens design type for those who move only (100%) their eyes. The number of lens design types is preferably large because the lens design can be performed more exactly.

An optimal lens design type can therefore be obtained by referring to the relationship table based on the basic visualizing action index $Ms_n$ calculated by using Equation (1) and the progressive visualizing action index $Mp_n$ calculated by using Equation (2).

According to the aspect of the invention, the change in the visualizing action due to aberrations and wobbling (when progressive addition lenses are worn) can be numerically expressed by calculating the basic visualizing action index and the progressive visualizing action index. An optimal lens design type can therefore be obtained by relating the resultant values to the relationship table, which relates the basic visualizing action index and the progressive visualizing action index to lens design types. An optimal lens can therefore be more readily designed.

The relationship table is reliable because it is obtained from sampled statistical data, whereby the lens design can be performed more exactly.

A method for manufacturing an eyeglass lens according to a second aspect of the invention is based on the method for designing an eyeglass lens described above.

According to the aspect of the invention, an eyeglass lens is manufactured based on the design determined by the designing method described above, whereby the same advantageous effect is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
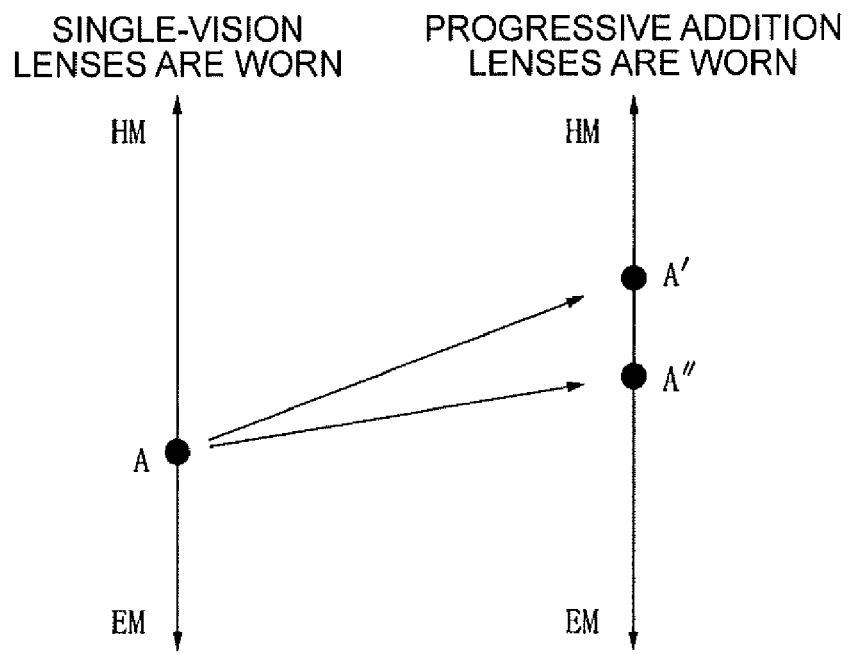
FIG. 1 is a descriptive diagram showing change in aberration-related visualizing action according to the invention.

An embodiment of the invention will be described below with reference to the drawings.

An eyeglass lens used in the present embodiment is a progressive addition lens. A progressive addition lens is an aspheric lens including two refracting regions (distance region and near region) having different refracting power and a progressive region which is located between the refracting regions and where the refracting power (dioptric power) progressively changes. Aberrations are present on both sides of the progressive region because the distance region and the near region need to be seamlessly connected to each other. Further, a difference in magnification between the two refracting regions distorts an image, which leads to a phenomenon called "wobbling" in which an image appears to wobble when a person who wears progressive addition lenses moves the head.

The tolerance to the aberrations and wobbling differs from person to person. For those who have low tolerance to the aberrations, it is preferable to design a lens in such a way that a region where the aberrations are present (aberration region) is small. Designing a lens in such a way that the aberration region is small and an aberration-free region (field of view) is wide is called "hard" design. On the other hand, for those who have low tolerance to the wobbling, it is preferable to design a lens in such a way that the amount of wobbling is small, that is, the aberration region is enlarged so that the aberrations spread over a wide range. Designing a lens in such a way that the aberration region is enlarged so that the amount of maximum aberration (distortion) decreases but the field of view is in turn small is called "soft" design.

In designing a progressive addition lens, wider-field-of-view-oriented design and less-wobbling-oriented design are contradictory to each other because the amount of wobbling increases with the amount of aberration on both sides of the progressive region. That is, in the hard design, the field of view is wide because the aberration region is narrow, but the wearer feels a large amount of wobbling when moving the head because the amount of maximum aberration in the aberration region is large. On the other hand, in the soft design, the field of view is narrow because the aberration region is wide, but the amount of wobbling is small because the amount of maximum aberration in the aberration region is small.

Consider now the visualizing action. When a person looks at an object located sideways, upward, or downward, those who primarily rotate their heads are called head movers (HMs), whereas those who primarily rotate their eyes are called eye movers (EMs). Since a HM moves the head and hence tends to feel wobbling, the soft design is preferably employed. On the other hand, since an EM uses the periphery of a lens to look sideways, the field of view is preferably wide and hence the hard design is preferably employed.

In the case of a single-vision lens, the amount of aberration and distortion is not large. Any portion of a single-vision lens can therefore focus an object. The visualizing action taken by a person who wears single-vision lenses to avoid aberrations or distortion is the same as the visualizing action taken by a person who wears no eyeglasses.

On the other hand, since aberrations and distortion present in a progressive addition lens are not small, the movement of the head or the eyes changes to avoid them. The visualizing action taken by a person who wears no eyeglasses or single-vision lenses therefore differs from the visualizing action taken by a person who wears progressive addition lenses.

FIG. 1 shows the ratio HM/EM measured to study aberration tolerance of those who wear single-vision lenses and the ratio HM/EM measured to study aberration tolerance of those who wear progressive addition lenses. The vertical axis in FIG. 1 represents the ratio HM/EM. The position HM represents those who move only (100%) their head. The position EM represents those who move only (100%) their eyes. The ratio HM/EM changes between the two extremes. The ratio HM/EM can be measured by using a measuring apparatus of related art.

In FIG. 1, when persons under test wear single-vision lenses, the ratio points at A shifted toward EM. When the persons under test wear progressive addition lenses and have low tolerance to aberrations of the progressive addition lenses, the amount of head movement increases because the persons under test want to avoid the aberration region as much as they can. It is therefore speculated that the ratio points at A' shifted toward HM. On the other hand, when the persons under test have high tolerance to aberrations of the progressive addition lenses, the amount of head movement does not greatly increase. It is therefore speculated that the ratio points at A" shifted toward HM but not to A'.

Figure 2:
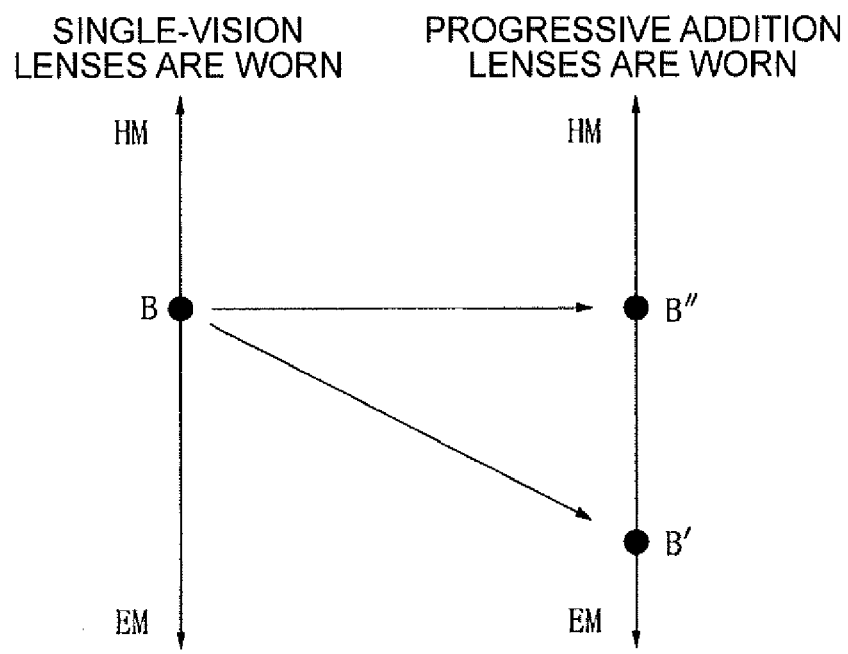
FIG. 2 is a descriptive diagram showing change in wobbling-related visualizing action according to the invention.

FIG. 2 shows the ratio HM/EM measured to study wobbling tolerance of those who wear single-vision lenses and the ratio HM/EM measured to study wobbling tolerance of those who wear progressive addition lenses. The vertical axis in FIG. 2 represents the ratio HM/EM.

In FIG. 2, the ratio points at B shifted to HM when persons under test wear single-vision lenses. When the persons under test wear progressive addition lenses and have low tolerance to wobbling of the progressive addition lenses, the persons under test avoid head movement because head movement causes them to feel wobbling, and the amount of eye movement increases accordingly. That is, it is speculated that the ratio points at B' shifted toward EM. On the other hand, when the persons under test have high tolerance to wobbling of the progressive addition lenses, the persons are not greatly aware of wobbling. It is therefore speculated that the ratio substantially stays unchanged and points at B".

As described above, the visualizing action taken by a person who wears progressive addition lenses changes with the person's tolerance to aberration and wobbling. Since the two phenomena, aberrations and wobbling, occur in a complex manner in actual measurement, one can know which is greater of the two types of tolerance, the tolerance to aberrations or the tolerance to wobbling, by knowing the dominant one of the two phenomena.

In consideration of this fact, numerically expressing the change in the visualizing action taken when there is no aberration or distortion and the visualizing action taken when there are aberrations and distortion allows a lens to be optimally designed.

Figure 3:
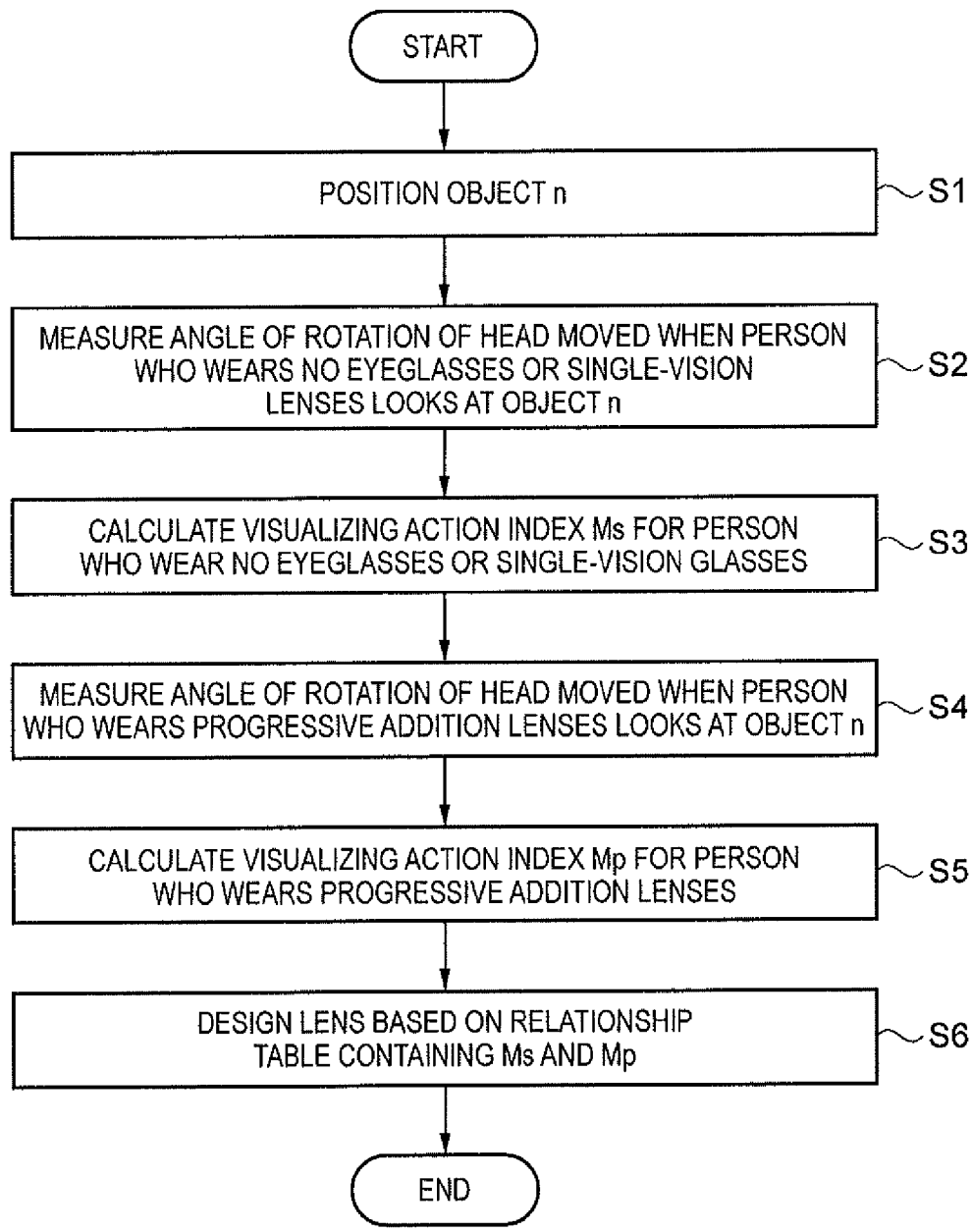
FIG. 3 is a flowchart showing a method for designing an eyeglass lens according to an embodiment of the invention.

A method for designing an optimal eyeglass lens will be described below with reference to the flowchart shown in FIG. 3.

1. Method for Designing Eyeglass Lens

Figure 4:
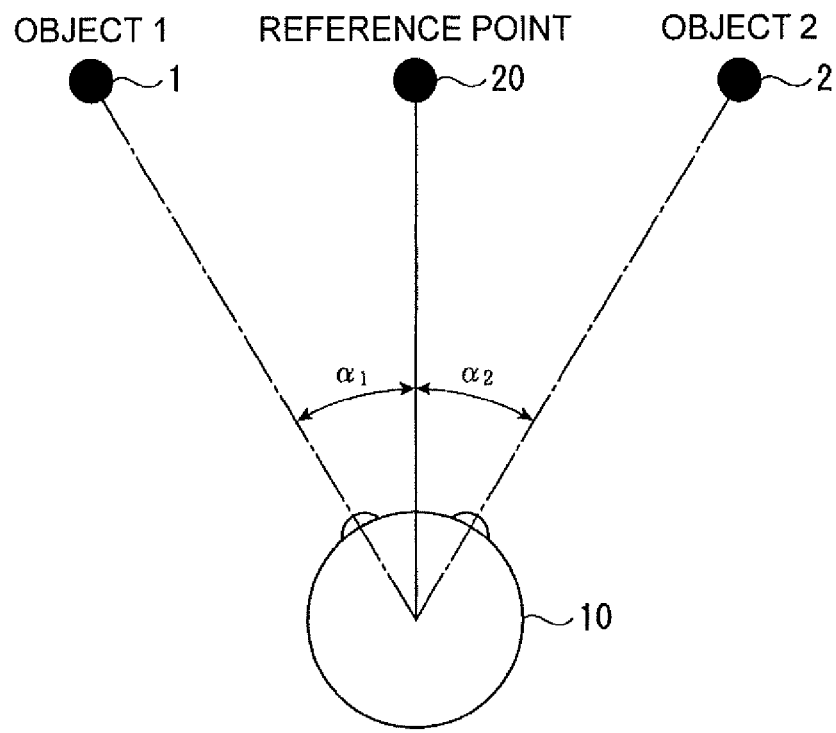
FIG. 4 is a descriptive diagram showing the positional relationship between a subject and an object in the embodiment.

First, an object 1 is placed in front of a subject 10 but on the left thereof and an object 2 is placed in front of the subject 10 but on the right thereof, as shown in FIG. 4. Define a reference point 20 in front of the subject, and let $\alpha_1$ be the angle between the direction of the line connecting the subject 10 to the reference point 20 and the direction of the line connecting the subject 10 to the object 1, and let $\alpha_2$ be the angle between the direction of the line connecting the subject 10 to the reference point 20 and the direction of the line connecting the subject 10 to the object 2 (step S1).

Figure 5:
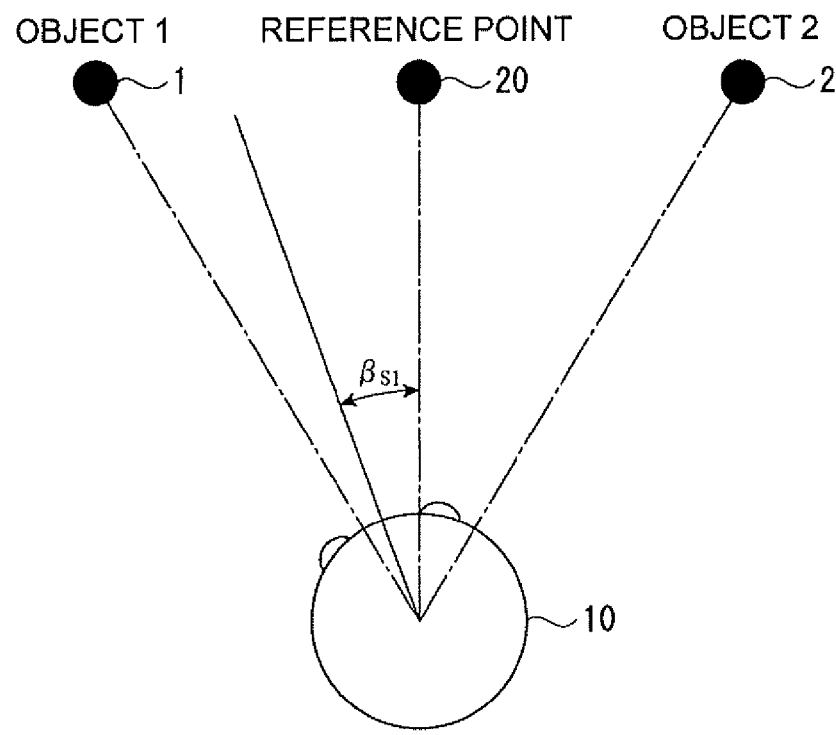
FIG. 5 is a descriptive diagram showing the positional relationship between the subject and the object when the subject looks at the object in the embodiment.

The angle of rotation $\beta s_1$ of the head moved when the subject 10 who wears no eyeglasses looks at the object 1 is measured, as shown in FIG. 5. The angle of rotation $\beta s_1$ of the head is the angle between the direction of the line connecting the subject 10 to the reference point 20 and the direction facing the subject 10 who is looking at the object 1. Similarly, the angle of rotation $\beta s_2$ (not shown) of the head moved when the subject 10 who wears no eyeglasses looks at the object 2 is measured. In this way, the angles of rotation of the head moved when the subject 10 who wears no eyeglasses looks at the objects are obtained (step S2).

A visualizing action index $Ms_n$ for the person who wears no eyeglasses is calculated based on the angles $\alpha_1$, $\alpha_2$, $\beta s_1$, and $\beta s_2$ obtained in steps S1 and S2 described above by using the following Equation (1) (step S3). The visualizing action index is a numerically expressed tendency in accordance of which a person looks at an object and represents how much the head is rotated in the present embodiment. That is, a visualizing action index of 0.7 means that 70% of the whole action is head movement and the remaining 30% is eye movement.

$$Ms_n = \frac{\beta s_n}{\alpha_n} \quad (n = 1, 2) \tag{1}$$

In Equation (1), n represents a value indicating each of the objects.

The visualizing action index $Ms_n$ is calculated for each of the objects. The average Ms of the visualizing action indices $Ms_n$ for all the objects is then calculated. The thus calculated Ms is used as a basic visualizing action index. In the present embodiment, n=1 represents the object 1 and n=2 represents object 2.

Thereafter, the angle of rotation $\beta p_1$ of the head moved when the subject 10 who now wears reference progressive addition lenses looks at the object 1 is measured. The angle of rotation $\beta p_1$ of the head is the angle between the direction of the line connecting the subject 10 to the reference point 20 and the direction facing the subject 10 who is looking at the object 1. Similarly, the angle of rotation $\beta p_2$ of the head moved when the subject 10 who wears the reference progressive addition lenses looks at the object 2 is measured. In this way, the angles of rotation of the head moved when the subject 10 who wears the progressive addition lenses looks at the objects are obtained (step S4). Each of the reference progressive addition lenses has been designed to be a statistical reference lens for performing person-oriented lens design.

A progressive visualizing action index $Mp_n$ for the person who wears the progressive addition lenses is calculated based on the angles $\alpha_1$, $\alpha_2$, $\beta p_1$, and $\beta p_2$ obtained in steps S1 and S4 described above by using the following Equation (2) (step S5):

$$Mp_n = \frac{\beta p_n}{\alpha_n} \quad (n = 1, 2) \quad (2)$$

In Equation (2), n represents a value indicating each of the objects.

The progressive visualizing action index $Mp_n$ is calculated for each of the objects. The average Mp of the progressive visualizing action indices $Mp_n$ for all the objects is then calculated. The thus calculated Mp is used as a progressive visualizing action index. In the present embodiment, n=1 represents the object 1 and n=2 represents object 2.

A lens design type is then determined based on the basic visualizing action index Ms for the subject who wears no eyeglasses and the progressive visualizing action index Mp for the subject who wears progressive addition lenses (step S6).

Figure 6:
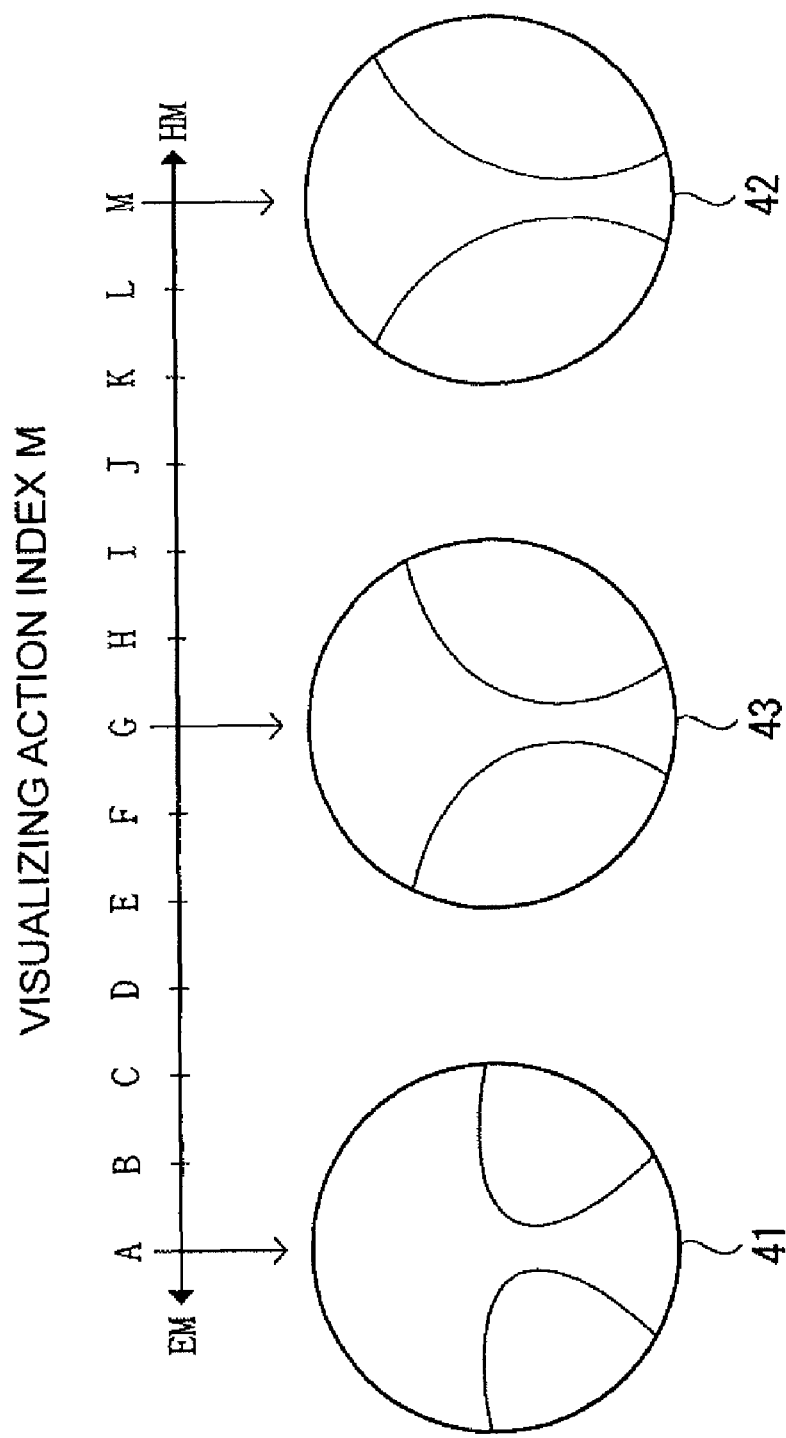
FIG. 6 shows the relationship between a visualizing action index and lens design in the embodiment.

FIG. 6 shows lens design types, and Table 1 shown below is a relationship table that relates the visualizing action indices (Ms and Mp) to the lens design types.

In FIG. 6, the lens design types are classified into 12 types, A to M, from hard design 41 to soft design 42. That is, the type A corresponds to lens design for EMs, who move only (100%) their eyes, and the type M corresponds to lens design for HMs, who move only (100%) their heads. In the types B to L, the ratio HM/EM successively changes, and the type G corresponds to balanced design 43 in which the ratio HM/EM is 50%/50%. The number of lens design types is not limited to 12 but may be adjusted as appropriate in accordance with the exactness of lens design.

Further, as shown in Table 1, lens design types corresponding to the basic visualizing action index Ms and the progressive visualizing action index Mp have been determined in advance based on sampled statistical data.

TABLE 1

| Ms | Mp | | | | |
|---|---|---|---|---|---|
| | 0.0 to 0.2 | 0.2 to 0.4 | 0.4 to 0.6 | 0.6 to 0.8 | 0.8 to 1.0 |
| 0.0 to 0.2 | E | D | C | B | A |
| 0.2 to 0.4 | G | F | E | D | C |
| 0.4 to 0.6 | I | H | G | F | E |
| 0.6 to 0.8 | K | J | I | H | G |
| 0.8 to 1.0 | M | L | K | J | I |

In Table 1, when the basic visualizing action index Ms is 0.5 and the progressive visualizing action index Mp is 0.7, for example, the optimal lens design type is F. In this case, since the progressive visualizing action index is shifted toward HM from the basic visualizing action index of 0.5, it is speculated that the subject has low tolerance to aberrations but high tolerance to wobbling. The F-type lens design, which is shifted toward the hard design 41, in which the field of view is enlarged, is therefore optimal.

An eyeglass lens is manufactured based on the thus determined lens design type along with a known method.

Examples of the method for manufacturing an eyeglass lens include machining a glass material or a polymer material in the form of a semifinished part or any other suitable form, injection or cast molding, and a combination of machining and molding.

According to the present embodiment described above, the following advantageous effects are provided.

In the present embodiment, the basic visualizing action index Ms for a subject who wears no eyeglasses and the progressive visualizing action index Mp for a subject who wears progressive addition lenses are calculated, and an optimal lens design type is determined by referring to Table 1, which relates the basic visualizing action index Ms and the progressive visualizing action index Mp to lens design types.

In this way, the difference between the basic visualizing action index Ms and the progressive visualizing action index Mp allows a lens designer to estimate each person's tolerance to aberrations and wobbling, whereby the lens designer can design a lens in accordance with the person's tolerance.

Further, since visualizing actions of each person are numerically expressed in the form of the basic visualizing action index Ms and the progressive visualizing action index Mp, an optimal lens for the person can be readily designed only by referring to the Table 1, which is a relationship table. In particular, the relationship table is reliable because it has been obtained from sampled statistical data.

The invention is not limited to the embodiment described above, but changes and modifications that are made to the extent that the purpose and advantageous effect of the invention can be achieved, of course, fall within in the scope of the invention.

For example, in the embodiment described above, the object 1 is placed in front of the subject 10 but on the left thereof and the object 2 is placed in front of the subject 10 but on the right thereof, but the number and position of objects are not limited thereto. A greater number of objects may be placed in various positions. An increased number of resultant data increases the reliability of the data, whereby an eyeglass lens more suitable for the subject 10 can be designed.

Further, in the embodiment described above, the basic visualizing action indices $Ms_1$ and $Ms_2$ and the progressive visualizing action indices $Mp_1$ and Mpg are calculated for the two objects 1 and 2, and the two types of indices are averaged to give the basic visualizing action index Ms and the progressive visualizing action index Mp, which are then used for lens design calculation. Instead of using the averages, the basic visualizing action index $Ms_n$ and the progressive visualizing action index $Mp_n$ for each of the objects may be reflected in lens design. For example, hard design can be applied to the left half of a lens and soft design can be applied to the right half of the lens in consideration of the direction in which the subject 10 looks at an object.

Since lens design at each point thereof can be optimized this way, a lens that is more comfortable for the subject 10 can be designed.

Further, the visualizing action indices Ms and Mp expressed by Equations (1) and (2) represent visualizing actions of the subject 10 in the embodiment described above. The visualizing action indices Ms and Mp are not necessarily expressed by Equations (1) and (2) but may be expressed by any amount that can represent visualizing actions of the subject 10.

For example, a value based on the angle of rotation of the head of the subject 10 is used as the visualizing action indices in the embodiment described above. When the distance from the subject 10 to the objects 1 and 2 is small, however, a value based on the positional relationship between the center of rotation of the head of the subject 10 and the eyes thereof may be used to calculate the visualizing action indices. In this case, the angle $\alpha_1$ between the direction facing the subject 10 and the direction of the line connecting the subject 10 to the object 1 is used to calculate the angle between the direction facing each of the right and left eyes and the direction of the line connecting the eye to the object 1. For example, an angle $\alpha_{1L}$ with reference to the left eye and an angle $\alpha_{1R}$ with reference to the right eye can be calculated by the following Equations (3) and (4).

$$\alpha_{1R} = \arctan\left(\frac{l\sin\alpha_1 - r\sin\theta}{l\cos\alpha_1 - r\cos\theta}\right) \quad (3)$$

$$\alpha_{1L} = \arctan\left(\frac{l\sin\alpha_1 + r\sin\theta}{l\cos\alpha_1 - r\cos\theta}\right) \quad (4)$$

where $$\theta = \arcsin\left(\frac{PD}{2r}\right)$$

In Equations (3) and (4), 1 represents the distance from the center of rotation of the head to the object; r represents the radius of the head; and PD represents the interpupillary distance. The angles $\alpha_{1L}$ and $\alpha_{1R}$ are used to perform ray tracing, and the basic visualizing action index Ms and the progressive visualizing action index Mp are calculated, as in the embodiment described above. A lens is then designed based on the thus calculated indices.

Since the angle of rotation of the head is small when the distance from the subject 10 to the objects 1 and 2, the method described above, in which a value based on the positional relationship between the center of rotation of the head and the eyes is used, allows the reliability of data to be further improved.

Further, the visualizing actions are related to lens design types by using the relationship table shown in Table 1 in the embodiment described above. Any relationship that can relate visualizing actions to lens design can alternatively be used as an index.

The invention can be used in eyeglass stores and other similar stores that provide progressive addition lenses optimally designed for each customer.

The entire disclosure of Japanese Patent Application No: 2009-259696, filed Nov. 13, 2009 is expressly incorporated by reference herein.

What is claimed is:

1. A method for designing an eyeglass lens, the method comprising:
   determining a basic visualizing action index representing a visualizing action taken when a person who wears no eyeglasses or single-vision lenses looks at an object;
   determining a progressive visualizing action index representing a visualizing action taken when the person who wears reference progressive addition lenses looks at the object; and
   enlarging the field of view as compared with that of the reference progressive addition lenses when the progressive visualizing action index shows greater head movement than the basic visualizing action index does, whereas enlarging an aberration region as compared with that of the reference progressive addition lenses when the progressive visualizing action index shows smaller head movement than the basic visualizing action index does.

2. The method for designing an eyeglass lens according to claim 1,
   wherein the determining a basic visualizing action index includes measuring an angle $\beta s_n$ between the direction facing the person and the direction in which the head is oriented when the person looks at an object located in the direction inclined to the direction facing the person by an angle $\alpha_n$ and calculating a basic visualizing action index $Ms_n$ by using the following Equation (1):

$$Ms_n = \frac{\beta s_n}{\alpha_n} \quad (n = 1, 2) \quad (1)$$

(in Equation (1), n represents each object)
   the determining a progressive visualizing action index includes measuring an angle $\beta p_n$ between the direction facing the person and the direction in which the head is oriented when the person looks at the object located in the direction inclined to the direction facing the person by the angle $\alpha_n$ and calculating a progressive visualizing action index $Mp_n$ by using the following Equation (2):

$$Mp_n = \frac{\beta p_n}{\alpha_n} \quad (n = 1, 2) \quad (2)$$

(in Equation (2), n represents each object)
   and the enlarging the field of view includes selecting a design type determined in advance for the basic visualizing action index and the progressive visualizing action index.

3. A method for manufacturing an eyeglass lens based on the method for designing an eyeglass lens according to claim 1.

* * * * *